C. F. OCKERMAN.
TIRE ARMOR.
APPLICATION FILED AUG. 29, 1917.
1,371,927.
Patented Mar. 15, 1921.
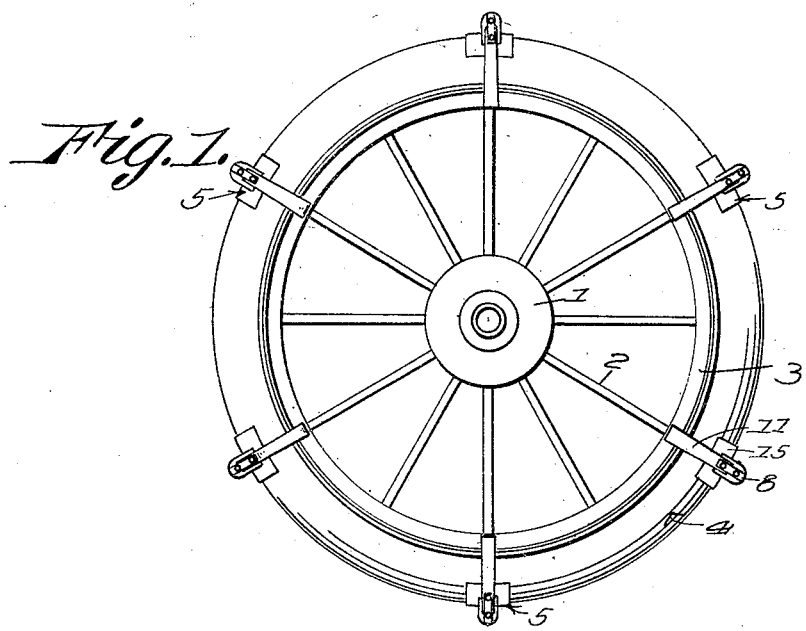
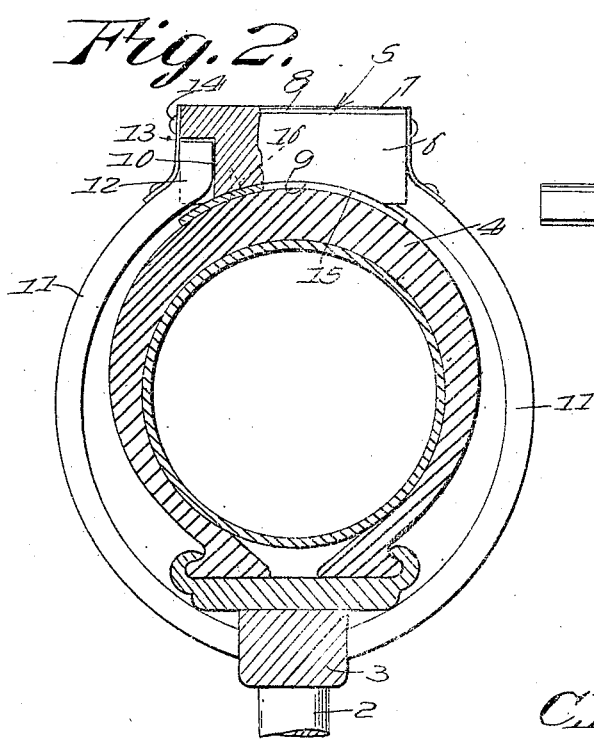
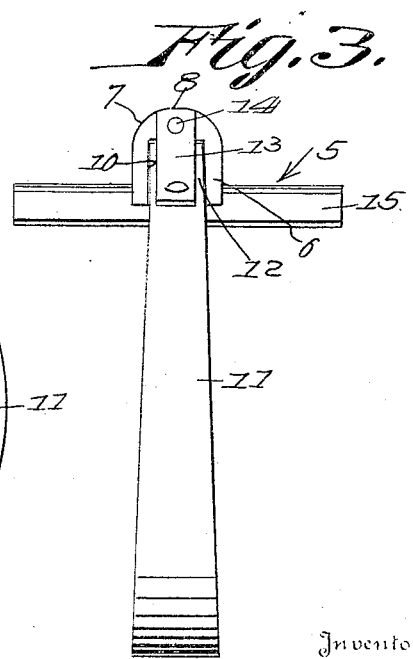
Inventor
C. F. Ockerman,
By Ettume Talbert
Attorney

UNITED STATES PATENT OFFICE.

CHARLES F. OCKERMAN, OF SPRINGFIELD, MISSOURI.

TIRE-ARMOR.

1,371,927.  Specification of Letters Patent.  Patented Mar. 15, 1921.

Application filed August 29, 1917. Serial No. 188,818.

*To all whom it may concern:*

Be it known that I, CHARLES F. OCKERMAN, a citizen of the United States, residing at Springfield, in the county of Greene and State of Missouri, have invented new and useful Improvements in Tire-Armors, of which the following is a specification.

This invention comprehends generally improvements in that class of inventions known as resilient wheels and more particularly has reference to an improved sectional tire armor.

As the primary aim and object, this invention contemplates the provision of a device of the above character composed of a plurality of independent armor sections designed for external application on a wheel felly and about the pneumatic casing thereon, serving to protect the casing against puncturing and for preventing skidding of the wheel.

It is an equally important object of this invention to provide a device of the above character wherein the construction permits of a ready and quick application of the sections of the armor in position independently of each other and likewise permits of the quick removal of the sections when desired.

More particularly, the present invention embraces the provision of a tire armor section wherein improved resilient clamping jaws are employed in conjunction with each tread member or cleat for permitting and assuring of the retention of the sections in position.

It is a more specific object of this invention to provide improved means carried by each tread member or cleat for preventing the latter from wearing or injuring the tire casing.

Among the other aims and objects of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration, a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:

Figure 1 is a side elevation of a wheel showing the improved armor applied thereto;

Fig. 2 is an enlarged transverse section through the tire casing and felly, one of the armor sections being shown in elevation and partly in section;

Fig. 3 is a side elevation of one of the armor sections.

Similar characters of reference are employed in all of the above described views, to indicate corresponding parts.

Referring now, more particularly, to the accompanying drawings, there is provided a wheel composed generally of a hub 1 having spokes 2 radiating therefrom and extended at their outer ends by a felly 3. A pneumatic tire casing 4 of a conventional construction is disposed about the felly and wheel arranged at uniformly spaced intervals transversely of the tire casing and circumferentially thereof and engageable with the opposite sides of the felly are the improved sections designated in their entireties by the numeral 5 composing the improved external tire armor.

In the present instance each of the sections 5 may be said to consist of a tread member or cleat 6 the opposite sides of which are beveled as at 7 toward the ground engaging face 8 while the end surface is provided with a longitudinally curved arcuate recess 9 for a purpose that will presently appear. The respective ends of each of the cleats are formed with opposed recesses 10 the latter opening into the inner edge of each cleat and terminating at the ends of the arcuate recess 9.

In order to independently attach the cleats of each section, arcuate clamping jaws 11 are employed the inner ends terminating in shanks 12 which are disposed in the recesses 10. Suitable resilient means such as leaf springs 13 are now employed and have their respective ends rigidly connected through the instrumentality of suitable fastening devices 14 to the jaws at the point of juncture with adjacent shanks and to the adjacent end of the cleat in proximity to the outer edge as indicated, the springs being designed to normally hold the shanks of each jaw against the inner end of the adjacent recess 10 so as to consequently normally hold the edges in close relation with each other. From this construction, however, it will be appreciated that the jaws may be moved away from each other against the tension of the springs 13 and arranged about the tire casing 4 so that the outer ends of the jaws subsequent to their release will be yieldingly held against opposite sides of the felly 3 as indicated in the drawings. Incidentally it will be apparent that by the construction and arrangement of parts described each of the sections may be quickly applied to and detached from the tire casing and the felly independently of each other and when in position serves to prevent puncturing of the tire and skidding of the wheel. As intimated, improved means have been provided for protecting the tire casing from the action of the cleats. In reducing this feature of the invention to practice a relatively wide and transversely curved flexible plate 15 is employed being formed preferably of leather and is rigidly secured longitudinally of the recess 9 by means of suitable fastening devices 16. When in position the respective ends terminate in planes in substantial alinement with the planes of the ends of each cleat as indicated in the drawings while the respective side edges terminate beyond the adjacent sides of each cleat so as to engage a larger area on the outer surface of the casing and thus protect the tire casing from the action of the cleats.

Having thus fully described this invention, what is claimed as new and desired to be secured by Letters-Patent, is:—

A device for the purpose indicated consisting of a tread member for transverse positioning on the tread of a vehicle tire, said tread member being formed at opposite ends with recesses, arcuate clamping jaws having terminal shanks disposed at an angle to the jaws and seated in said recesses, and flat springs secured respectively on the ends of the tread member and overlapping the shanks and secured to the said jaws adjacent the shanks thereby tending to force the jaws toward each other so that the latter may be engaged with a vehicle wheel in straddling relation to the tire thereof, the free terminals of the jaws bearing against the felly of the wheel.

In testimony whereof I affix my signature.

CHARLES F. OCKERMAN.